May 20, 1941.  H. B. FRANKLIN  2,242,858
WEED GUARD AND HOLDER
Filed Oct. 25, 1940
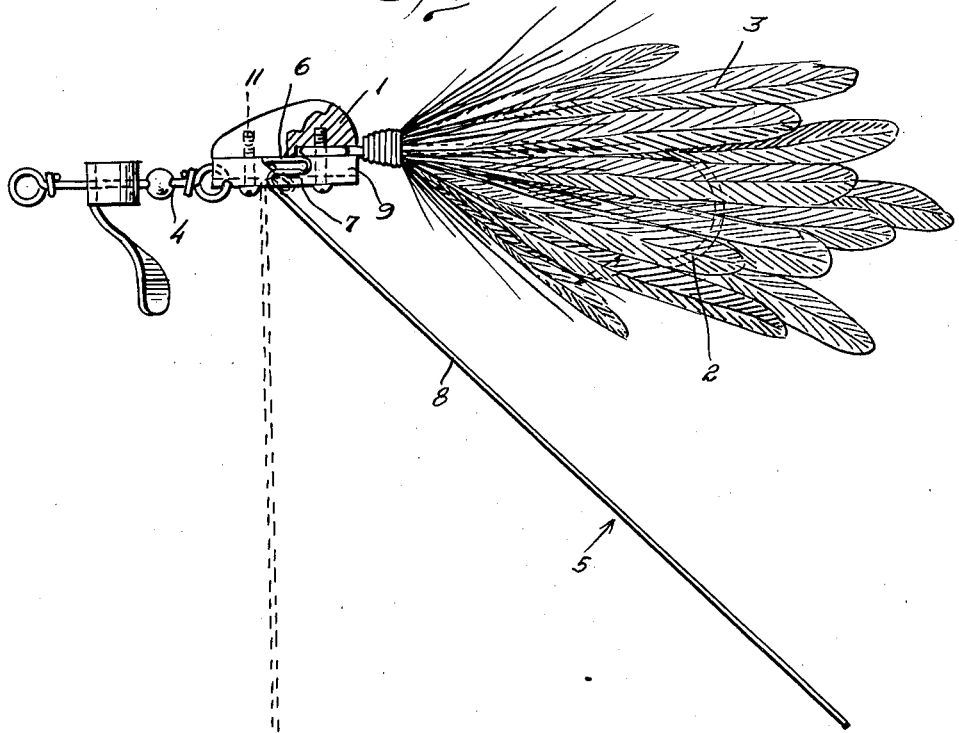
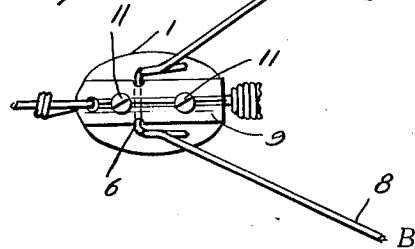
Inventor
Higgs B Franklin
By Clarence A O'Brien
Attorney

UNITED STATES PATENT OFFICE 2,242,858

WEED GUARD AND HOLDER

Higgs B. Franklin, Union Springs, Ala.

Application October 25, 1940, Serial No. 362,365

1 Claim. (Cl. 43—39)

This invention relates to a weed guard for fish lures and a holder for the same, the general object of the invention being to provide a weed guard so supported on the body of the lure that it will be movable so that by the slightest contact with the fish it is knocked forward and does not interfere with the strike of the fish and his contact with the hook and when struck by a fish and knocked forward, and if the fish is not caught, the force of the water immediately returns the guard to its normal position to prevent weeds and the like from being caught by the hook.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which—

Figure 1 is an elevational view of a lure provided with the invention, this figure showing the guard in its normal position in full lines and in a forward position in dotted lines.

Figure 2 is a top plan view with parts omitted.

Figure 3 is a view of the holder.

In these views the body of the lure is shown at 1, the hook at 2, the feathers at 3, and the swivel at 4. The guard is shown at 5 and is formed of a length of wire which has its intermediate part first bent into U-shape as shown at 6 and then each limb of the U is bent into an open loop 7 with the long arms 8 extending downwardly and rearwardly from the front ends of the loops. A V-shaped holder 9 is provided with perforations 10 for receiving screws 11 which pass into the body from the underside thereof, the rear screw holding the eye of the hook to the body as shown in Figure 1. Notches 12 are formed in side edges of the holder for the passage of the bight of the U-shaped part 6 and one of the perforations receives the eye of the swivel as shown.

The bight of the U-shaped part 6 is rotatably supported by the holder so that the guard can swing forwardly or rearwardly. The long lengths of the arms 8 make the device practically weedless and when the lure is reeled in it is held back at approximately 40 degree angle protecting the hook. When the fish strikes the guard is moved forwardly and does not interfere with the strike of the fish nor its contact with the hook. If struck by a fish or knocked forward and then if the fish is not caught, the force of the water will immediately return the guard to its weedless position. The guard has a considerable spread which further protects it from hanging the object when being run through the water.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a fish lure, a body, a holder detachably connected with the bottom of the body, a wire guard having a centrally arranged U-shaped part, the holder having notches therein through which the bight of the U-shaped part passes, the limbs of the U-shaped part having loops extending forwardly, and outwardly and downwardly extending arms connected with the forward ends of the loops.

HIGGS B. FRANKLIN.